Dec. 6, 1955  I. E. COFFEY ET AL  2,725,864
RESTARTING SYSTEM
Filed June 7, 1951

INVENTOR.
IRVEN E. COFFEY
GEORGE R. ERICSON
BY
George R. Ericson
ATTORNEY

United States Patent Office 2,725,864
Patented Dec. 6, 1955

2,725,864

RESTARTING SYSTEM

Irven E. Coffey, Clayton, and George R. Ericson, Kirkwood, Mo.

Application June 7, 1951, Serial No. 230,402

8 Claims. (Cl. 123—179)

The present invention relates to control systems for electric starters of internal combustion engines for motor vehicles or the like. More specifically, it relates to that part of the control system which actuates the relays, and the like, to control the electric power supply to the starter motor for the engine.

In most of the present models of motor cars, especially those equipped with automatic transmissions, it is not possible to restart the engine when it stalls without first moving the transmission control selector lever from a driving position to a position indicating neutral or park. This obvious safety feature is necessary to prevent injury to the vehicle, its occupant, or any person or property adjacent the vehicle, in case the engine could be started with the control selector lever in the driving position.

In motor vehicles equipped with ordinary gear transmissions, it is rather common to leave the transmission control selector lever in driving position when parked, but if the operator forgets to release the clutch or shift it to neutral position before operating the starter switch, the movement of the car usually warns him in time to release the clutch or the starter switch before the engine can start and any serious damage is done. This is because the starter is driving the car forward or backward and battery power is insufficient to turn the engine fast enough to start.

This is not the case with automatic transmissions, however, since practically all types incorporate a fluid coupling and/or torque converter. In the absence of a safety feature, such as that now generally used and above described, if the starter were operated with the control lever in a driving position, there obviously would not be the immediate warning movement of the car, such as above mentioned by direct gear types, nor would a heavy load be imposed on the battery because of the amount of slip in fluid drives at low speed. For this reason, the engine would probably start and the car surge forward or backward, depending on the position of the transmission control selector lever.

To obviate this obvious danger, the control circuit for the starter is usually provided with an additional safety switch operated by the transmission control selector lever, which switch is connected in series with the ignition switch and manually operated starter switch and which is closed only in indicated neutral or park positions of the transmission control selector lever. Although this provides a desirable safety feature, it also has some disadvantages.

For example, if the engine should stall while the control selector lever is in a driving position, the engine cannot be restarted by closing the manually operated starter switch until the control selector lever is shifted to an indicated neutral position. This disadvantage confuses and delays restarting the engine and is decidedly irritating to the operator if the engine stalls in heavy traffic. It is possible for the engine to stall under such conditions due to improper fuel feed or the like. The delay in restarting incurred as a consequence to shifting the control selector lever to a neutral position and, at the same time, operating the usual manual starter switch, the accelerator, and the brake, if the car happens to be on an incline, can be decidedly confusing even to an experienced driver.

It appears that restarting the stalled engine by operation of the manual starter switch alone without any movement of the control selector lever, would be advantageous, provided the safety features of the conventional system could be retained. To accomplish this function, it has been proposed that an additional circuit be added to shunt the safety switch operated by the control selector lever, which shunt circuit would be under control of means responsive to a power source indicative of engine operation to control the additional circuit for a predetermined time after power failure so that only actuation of the usual manual starter switch is necessary to restart the stalled engine. This is described and claimed in a copending application of Collins and Ericson, Serial No. 223,778, filed April 30, 1951, now Patent No. 2,685,650 of August 3, 1954.

Although, when tested, such a device as above described is successful, it appears safer to limit this restarting feature to one position of the transmission control selector lever which is normally chosen for driving in a forward direction. The restarting feature does not appear necessary in other driving positions of the transmission control selector lever for in traffic the lever is necessarily set in a usual forward driving position.

More specifically, the invention relates to a means effective to shunt the selector lever actuated safety switch of the starter control circuit which means is an additional circuit under control of a device responsive to a condition indicative of operation of a power source to close the additional circuit after power failure, whereby the engine can be restarted by merely operating a manually controlled starter switch without moving the control selector lever from the position in which it is normally set for driving in a forward direction.

It is the object of this invention to provide an additional circuit and a power responsive control means for that circuit effective to temporarily shunt the portion of the starter circuit controlled by the switch operated by the transmission control selector lever.

A further object of the invention is to provide a power responsive control means for the additional circuit which has two cycles of operation; a first in which it closes the circuit during engine operation; and a second, a predetermined period after the first in which it opens the circuit.

It is a further object of the invention to provide a starter control circuit with an additional circuit and a means operated in response to engine failure when the control lever is shifted to an indicated driving position which will close the additional circuit for a predetermined time to provide for emergency restarting of the engine by the manually operated starter switch and then open the additional circuit and maintain it open to provide the usual safety feature provided by the safety switch.

It is a further object of this invention to provide in a motor vehicle, a power responsive means to momentarily shunt a portion of the starter control system when the control selector lever is in a driving position.

Referring to the drawings.

Figure 1:
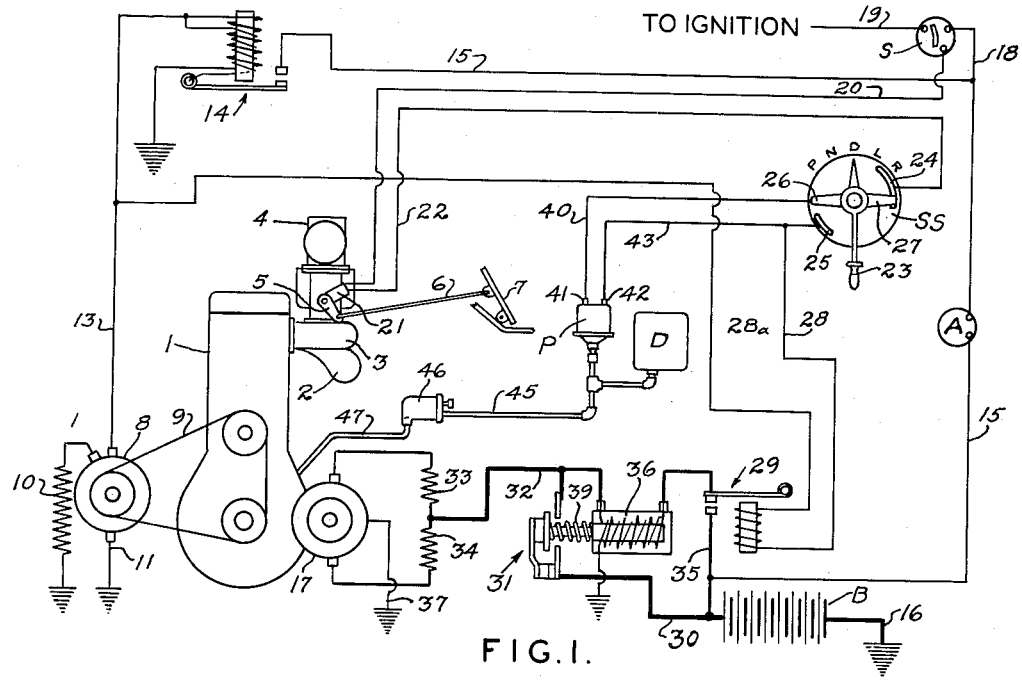
Figure 1 is a wiring diagram illustrating the application of the invention to one type of conventional starter control circuit.

The drawings are intended to illustrate a conventional generator and starter control circuit for the engine of one of the present makes of motor cars and the connection of the additional control circuit thereto. The particular showing is not intended as restrictive, since the invention may be applied to all starter circuits by interconnection therewith of a safety switch to be actuated by movement of a control selector lever if one is not already provided in the starter control circuit.

In the drawings, the engine is indicated at 1 and is provided with the usual exhaust and intake manifolds indicated at 2 and 3, respectively. On the intake manifold is mounted a carburetor 4 provided with the usual throttle control arm 5 connected by a rod 6 to the accelerator pedal 7. The engine drives the generator 8 through a belt connection 9 and the generator is provided with a connection of the field 10 to ground. Opposite poles of the brushes of the generator are connected respectively with the ground at 11 and with a lead 13 which extends to the usual generator cut-out relay 14 which is closed only when the engine is running and the generator producing a current. The relay 14 is, in turn, connected to a lead 15 extending to the ammeter and to one terminal of a battery B, the other terminal of which is connected by lead 16 with the ground. Mounted on the engine is a starter motor 17 which is engageable and disengageable to drive the engine to start the same in response to power supplied thereto. Connecting the lead 15 to the battery, is a lead 18 which extends to the primary of an ignition switch S of the three pole type. When operated, the switch completes the circuit from the primary to the leads 19 and 20, the former of which leads to the usual ignition system and the latter of which leads to a starter control circuit, thereby connecting both to the battery.

The starter control circuit will now be described. The lead 20 from the switch S is connected with a manually operated starter switch 21, which is operated from the accelerator pedal 7 by the throttle arm 5. This switch is of the type shown in the Coffey Reissue Patent No. 22,385, which switch is operative by pedal 7 when the engine is at rest to connect the lead 20 to the lead 22 and inoperative when the engine is running to complete the circuit. The lead 22 extends to the safety switch indicated by the letters SS. The safety switch, in turn, is connected directly to be operated by the transmission control selector lever 23. The transmission control selector lever is, in turn, provided with several positions to select transmission operation. These positions are indicated as P, N, D, L, and R. In positions of the transmission control selector lever corresponding to the positions P and N, which are not drive connecting positions of the transmission, the safety switch is provided with opposite terminals 24 and 25. These terminals are connected by the oscillating double pole contact arm 27 of the switch when the control selector lever is in these positions P or N, but the connection is broken by movement of the contact arm when the control selector lever is in the positions D, L, and R, corresponding to driving positions of the transmission. From the contact 25 of the safety switch SS, a lead 28 is provided extending through the relay, generally indicated at 29, and through lead 28a to ground by way of the lead 13 through the generator brushes. The relay 29 is of the type which, when energized, will close the main circuit from the battery to the starter, thereby providing the starter with power from the battery to operate the engine. The main power supplying starter circuit will be later described.

From the description so far, it can be understood that the control circuit for the main power supply to the starter leads from the battery by way of the lead 15 to the ignition switch, by way of the lead 18, to the primary terminal of the ignition switch S, to the ignition by way of lead 19, and to the starter control circuit by way of lead 20. In the circuit, in series with the ignition switch S, is interposed the manually operated starter switch 21 to which the leads 20 and 22 connect and the safety switch connected to the transmission control selector lever 23 which in turn connects through the relay 29 to the ground by way of the brushes of the generator. When the engine is not in operation, therefore, the circuit is closed by operation of the ignition switch S, the safety switch SS and the manually operated starter switch 21 to energize the relay 29 and close the main power circuit to the starter motor. However, if the engine is in operation, the current will flow in the opposite direction from the generator through the lead 13, lead 28a, to relay 29, thereby opening the circuit in the main starter power supply by holding the relay 29 open, even if accidentally a short circuit should occur in any or all of the switches above described.

The main power circuit of the starter motor will now be described. This comprises a main lead from the battery B, indicated at 30, through the solenoid relay 31 to lead 32, connecting with split field coils 33 and 34 of the starter motor, and thence to ground through the frame of the engine and starter motor connection, as shown diagrammatically at 37. Power for the starter solenoid relay, which is of the usual type having the dual function of engaging the pinion drive and closing the starter motor circuit, is from the battery to lead 35 through contacts of relay 29, to relay windings 36, and also through the holding winding which is grounded as shown at 38 in the drawings. The main starter solenoid relay 31 is biased to open position with the drive disengaged at all times by a spring indicated at 39, and is closed only in response to closing of relay 29 to energize the field coil thereof and thereby complete the circuit from the battery to the solenoid relay to the field of the starter motor, and thence to ground.

So far a conventional starter motor circuit has been described, using a safety switch, whereby the operation of the starter motor is prevented during positions D, L, and R of the starter safety switch and energization of the starter control system is confined to the positions P and N of the starter safety switch.

In order to carry out the objects of the invention as expressed above, the safety switch is modified by slightly extending the terminal 24 in the clockwise direction, and the safety switch is further modified by being provided with an additional terminal 26 which corresponds with the position of the opposite arm of the two pole switch arm 27 when the transmission control selector lever is in the D, or driving position.

It is obvious that instead of modifying the usual safety switch, a second switch in addition to the standard safety switch but similar in construction could be used, actuated by the transmission control lever in the same way as the safety switch, and arranged to perform the same function as the additional terminal above described now provided in the conventional safety switch, and by connecting the second switch in series with the oil pressure switch in a circuit shunting the safety switch.

In the embodiment described hereafter, the two switches are in effect combined by the modifications to the safety switch, thereby incorporating in one structure the combined function of two separate switches.

The additional terminal 26 of the safety switch is connected by a lead 40 with one terminal 41 of a pressure operated switch P. The other terminal of the pressure operated switch 42 is connected by a lead 43 with contact terminal 25 of the safety switch. It can be readily seen that when pressure switch P is closed, then the circuit through the safety switch is shunted in the drive position of the control selector lever. Pressure switch P is of a type which will be later described in detail and is connected by a line 45 to a combined check valve and metering device 46 and thence by pipe line 47 with the oil pump of the engine, or the like, which is a means indicative of operation of the power source. The combined check valve and metering device is of the type which permits free flow of pressure fluid through the line 45 to the pressure switch P and the air dome D interconnected in line 45, but is provided with a check valve, trapping the pressure in the dome and pressure switch body when the oil pressure in line 47 fails so that the switch will be held closed for a predetermined time. This is accomplished by a metering device in the check valve body 46 which provides for a gradual escape of fluid under pressure from the pressure switch P to the line 47. The rate of pressure escape through the line 45 to the line 47 is controlled by the metering device. The volume of fluid necessary to lower the pressure in the switch body is controlled by the size of the pressure dome D. The above described metering device acting with the pressure dome forms a timer adjustable to determine the time that the switch is closed.

A complete system has been described, the function of which forms an operative circuit which will carry out the object of the invention as described above. For example, in the first condition, with the engine initially at rest, switch P is open, therefore, closing of ignition switch S and operation of throttle pedal 7 will not start the engine unless the control selector lever for the transmission is positioned in one of the positions indicated as P or N. In any of the positions D, L or R the circuit is open and clearly the safety features of the starter circuit when equipped with a safety switch of the type described herein are preserved. On the other hand, if the safety switch is in the position corresponding to positions P and N of the transmission control selector lever, the circuit is completed by closing the ignition switch and operation of the pedal 7 and the starter motor will respond.

If the engine has been started and has built up pressure in the switch P, its contacts will close thereby connecting contact 26 of the safety switch with contact 25 and the function of the safety switch will be at least partially shunted from the circuit control. Now, if the engine should stall in traffic with the transmission control selector lever in the position D which is normally chosen for driving in a forward direction, switch P will remain closed or will subsequently close for a predetermined time, even though pressure in the line 47 drops due to the effect of the metering device 46. This being the case, the safety switch remains shunted from the control circuit. Therefore, if engine starter switch 21 is closed by operation of the accelerator pedal 7, the starter control circuit is energized by closing of the relay 29. Power will be supplied to the starter motor and will operate the starter motor to restart the engine 1. It should be noted that the safety switch remains effective at all times, however, to prevent restarting of the engine by operation of the manual starter control switch in positions L and R which correspond with selected positions for special driving conditions, namely, low speed and reverse, for instance.

Figure 2:
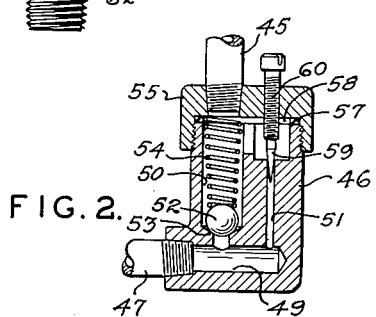
Figure 2 is a cross section of a combined check and metering valve suitable for use in the oil line to the pressure switch.

Referring to Figure 2, which shows a combined check valve and metering device, it will be noted that the oil line 47, connects with the chamber 49 in one end of the body, and extending transversely thereto and communicating therewith, are two passages indicated as 50 and 51. In the first passage is a ball valve 52 pressed against seat 53 by a spring 54 interposed between the ball and a cap 55 screw threaded onto the body 46 and spaced slightly therefrom by a thick gasket 57 to form a second chamber 58.

In the second passage 51 is a needle valve 59 which, in turn, is adjustably mounted to vary the flow through the passage 51 by means of screw threads 60 thereon cooperating with corresponding threads in the cap 55. Both passages 50 and 51 communicate with the chamber 58 which, in turn, is directly connected to the oil line 45 leading to the pressure switch.

From this description so far, it can be readily understood that oil pressure from the oil pump or other power source will enter the chamber 49 through oil line 47. Spring 54 is so selected as to permit ball valve 52 to unseat before full engine oil pump operating pressure is reached and oil will fill the entire body 46 and escape through line 45 where it will compress the air in the dome D and, if present, that in the switch body P to operate the switch.

When oil pump pressure fails, valve 52 will seat, trapping the oil in body 46 and line 45. Oil pressure will be relieved gradually in line 45 and likewise on switch P, as the oil leaks past needle valve 59 through passage 51 to chamber 49 and supply line 47. The rate of pressure release may be readily controlled by needle valve adjustment, while the time required to relieve the pressure on the switch P can be controlled by selection of air dome D. In other words, the more rapid the desired response, the smaller the size of the air dome for any given rate of flow past the needle valve. Conversely, the larger the dome, the slower the response for any given rate past the needle valve.

Figure 3:
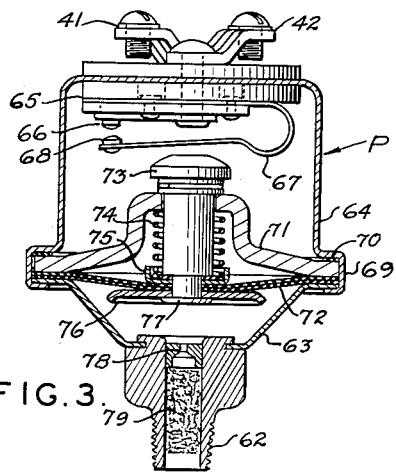
Figure 3 is a cross sectional view of two cycle type of pressure switch suitable for controlling the additional circuit.

Figure 3 illustrates one preferred form for a pressure switch, generally indicated at P, in Figure 1. The switch comprises a nipple provided with threads 62 for connection to an oil line 45, or the like, and a two part outer casing with a lower part 63 sealed to nipple 62 and an upper part 64 of inverted cup shape, carrying inside its upper wall a switch base member 65. On this base is a fixed contact 66 connected to one of the outer terminals thereon 41 and a U-shaped spring member 67 carrying a second contact 68 opposed to contact 66. Contact 68 is connected with terminal 42 by means of U-shaped spring member 67. Both the spring member and the fixed terminal are attached to the casing by rivets passing through the casing, the base plate, and a cover plate of insulating material.

The upper part of casing 64 is provided with a flange portion 69 which supports in superposed relation an upper sealing gasket 70, the peripheral flange portion of a bridge member 71, a flexible diaphragm 72, and a lower housing member 63, respectively. The bridge member 71 is centrally apertured to receive a headed plunger 73 of insulating material which has a metal shank portion slidable in the aperture and urged to a downward position by a spring 74 with its upper end resting against the under side of the bridge member 71 and its lower end resting on the upper one 75 of a pair of washers 75 and 76, between which the diaphragm 72 is secured by a rivet 77 at the end of the shank opposite the headed plunger 73. As shown in this figure, the oil line connection nipple 62 is provided with a metering orifice 78 to control the rate of flow of fluid in or out of the switch body. It also contains a filter element 79. It is readily apparent that fluid under pressure from a power source entering through the filter element 79 and orifice 78 will act on the diaphragm 72 until headed plunger 73 raises spring arm 67 to close the contacts 66 and 68 thereby completing an electric circuit from the terminal 41 to 42. This switch is regarded as a two cycle type.

Figure 4:
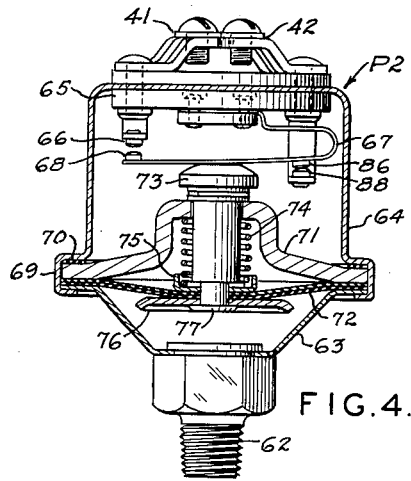
Figure 4 is a cross sectional view of three cycle type of pressure switch suitable for controlling the additional circuit.

Figure 4 illustrates a preferred form of double contact pressure switch or the three cycle type, such as generally indicated at P2. The body of the switch is constructed in a like manner to that in Figure 3 already described in detail. Internally, the switch mechanism differs in two material respects. Where the parts are identical, however, the same reference characters have been applied. As before set forth, the body of the switch is constructed in two parts 63 and 64. The lower portion of the body 63 is sealed to the nipple 62 in a manner already described with reference to Figure 3. The upper casing part 64 mounts an insulating base member 65 in like manner also, except that in this particular embodiment of the invention, the base member 65 carries two fixed contacts 66 and 68 spaced on opposite sides of the plunger element 73. Opposed to these contacts are two spring mounted contacts 88 and 86, respectively. Fixed contact 88 connects with terminal 42, while fixed contact 66 connects with terminal 41. In this respect this switch differs from the preceding switch in Figure 3, and the circuit is completed between the two terminals by the simultaneous engagement of contacts 66, 68 and contacts 86, 88. The switch plunger is mounted in the same manner and operates in the same way as does that in Figure 3 and a repetition of description is not deemed necessary for an understanding of the device.

In operation, as the plunger 73 rises, due to pressure from a power source on the diaphragm 72, the contacts 66 and 68 are brought into engagement with one another, thereby closing the circuit between the terminals 41 and 42. As the plunger 73 continues to rise, eventually the spring 67 is deformed to the extent where contacts 86 and 88 are separated, thereby breaking the circuit between the terminals 41 and 42. The switch operates exactly the same way in the reverse manner when pressure is relieved beneath diaphragm 72.

The travel of the plunger, therefore, produces three cycles of operation in each complete movement up or down and the circuit will be open when the switch is subject to pressure from the oil line and will also be open a predetermined time after the pressure is completely relieved, as determined by the setting of the regulating needle valve 60. But during its travel from top to bottom, or vice versa, the circuit is closed for a predetermined period. The advantages of a three cycle type of switch in the circuit shown in Figure 1 are quite obvious, since for either a condition where the power source actuating the switch in operative or inoperative, the switch is open and it closes only a predetermined time after the engine either begins to operate or ceases to operate, as determined by the adjustment of the needle valve 60 of the timing means.

The power source contemplated is the engine or any one of the numerous means, fluid, mechanical or electrical, driven by the engine and indicative of engine operation. In this case the oil pump is merely illustrative.

It will be understood that when either the structure of Figure 3 or Figure 4 is connected in the control circuit of Figure 1, a means actuated in response to conditions indicative of power supply or power failure, will be provided in the system. This complete system will carry the objects of the invention; that is, to provide for emergency restarting of the stalled engine.

It should be understood that either pressure or suction type switches can be used in the system of Figure 1, and the switches and the circuits described are merely illustrative of the invention and not intended in a limiting sense. And as has been pointed out, the various connections of the switches into the circuits may be in any manner falling within the scope of the invention as defined by the appended claims.

We claim:

1. In a motor vehicle having an engine, a transmission, a transmission control movable to positions for selecting neutral, drive and reverse conditions of response for said transmission, a starting system including a starter motor for said engine, a battery powered circuit for said motor having a manually operated starter switch and a safety switch in series relation in said circuit and a connection between said safety switch and said transmission control for closing said safety switch when said transmission control is positioned to select a neutral condition of response for said transmission; the combination of a second starter motor circuit including said manually operated starter switch temporarily active to restart the engine when it it stalls by closing said starter switch when said transmission control is positioned to select the drive condition of response for said transmission, comprising switch means in said second circuit in series relation with said manually operated starter switch, and means to operate said switch means to close said second circuit to said manually operated starter switch operated by the engine when said transmission control is positioned to select the drive condition of response for said transmission.

2. In a motor vehicle having an engine, a transmission, a transmission control movable to positions for selecting neutral, drive and reverse conditions of response for said transmission, a starting system including a starter motor for said engine, a battery powered circuit for said motor having a manually operated starter switch and a safety switch in series relation in said circuit and a connection between said safety switch and said transmission control for closing said safety switch when said transmission control is positioned to select a neutral condition of response for said transmission; the combination of a second starter motor circuit including said manually operated starter switch temporarily active to restart the engine when it stalls by closing said starter switch when said transmission control is positioned to select the drive condition of response for said transmission, comprising a second starter motor circuit, a switch means in said circuit in series relation with said manually operated starter switch, and means to close said switch means operated by the engine when said transmission control is positioned to select the drive condition of response for said transmission.

3. In a motor vehicle having an engine, a transmission, a transmission control movable to positions for selecting neutral, drive and reverse conditions of response for said transmission, a starting system including a starter motor for said engine, a battery powered circuit for said motor having a manually operated starter switch and a safety switch in series relation in said circuit and a connection between said safety switch and said transmission control for closing said safety switch when said transmission control is positioned to select a neutral condition of response for said transmission; the combination of a second starter motor circuit including said manually operated starter switch temporarily active to restart the engine when it stalls by closing said starter switch when said transmission control is positioned to select the drive condition of response for said transmission, comprising a second starter motor circuit, a switch means in said circuit in series relation with said manually operated starter switch, means to close said switch means operated by the engine when said transmission control is positioned to select the drive condition of response for said transmission, and timing means associated with said switch means for maintaining said second circuit operable for a limited period after the engine stops.

4. In a motor vehicle having an engine, a transmission, a transmission control movable to positions for selecting neutral, drive and reverse conditions of response for said transmission, a starting system including a starter motor for the engine, a battery powered circuit for said motor having a manually operated starter switch and a safety switch in series relation in said circuit and a connection between said safety switch and said transmission control for closing said safety switch when said transmission control is positioned to select a neutral condition of response for said transmission; the combination of a second starter motor circuit including said manually operated starter switch temporarily active to restart the engine when it stalls by closing said starter switch when said transmission control is positioned to select the drive condition of response for said transmission, comprising switch means in said second circuit in series relation with said manually operated starter switch, and means to operate said switch means to close said second circuit to said manually operated starter switch operative after the engine stalls when said transmission control is positioned to select the drive condition of response for said transmission.

5. In a motor vehicle having an engine, a transmission, a transmission control means movable to positions for selecting neutral, drive and reverse conditions of response for said transmission, a starting system including a starter motor for the engine, a battery powered circuit for said motor having a manually operated starter switch and a safety switch in series relation in said circuit, and a connection between said safety switch and said transmission control for closing said safety switch only when said transmission control is positioned to select a neutral condition of response for said transmission; the combination of a second starter motor circuit including said manually operated starter switch, switch means in said second circuit in series relation with said manually operated starter switch, and means associated with the engine and operable to close said switch means only when the engine stalls with said transmission control means positioned to select the drive condition of reponse for said transmission.

6. The combination defined in claim 5 wherein said switch means is combined with said safety switch.

7. In a motor vehicle having an engine, a transmission, a transmission control means movable to positions for selecting neutral, drive and reverse conditions of response for said transmission, a starting system including a starter motor for the engine, a battery powered circuit for said motor having a manually operated starter switch and a safety switch in series relation in said circuit, and a connection between said safety switch and said transmission control for closing said safety switch only when said transmission control is positioned to select a neutral condition of response for said transmission; the combination of a second starter motor circuit including said manually operated starter switch, switch means in said second circuit in series relation with said manually operated starter switch, means associated with the engine and operable to close said switch means only when the engine stalls with said transmission control means positioned to select the drive condition of response for said transmission, and timing means associated with said switch means for maintaining said switch means closed for a limited period after the engine stops.

8. The combination defined in claim 7 wherein said switch means is combined with said safety switch.

References Cited in the file of this patent

UNITED STATES PATENTS

| | | |
|---|---|---|
| 1,788,713 | Good et al. | Jan. 13, 1931 |